(12) United States Patent
Taba et al.

(10) Patent No.: US 12,367,572 B2
(45) Date of Patent: Jul. 22, 2025

(54) COMPUTING DEVICE AND COMPUTING METHOD FOR EVALUATING STRENGTH OF ARTICLE FORMED BY 3D PRINTER

(71) Applicant: MITSUBISHI HEAVY INDUSTRIES, LTD., Tokyo (JP)

(72) Inventors: Shunsuke Taba, Tokyo (JP); Kazuhiro Miura, Tokyo (JP); Takayuki Shimizu, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 367 days.

(21) Appl. No.: 17/801,411

(22) PCT Filed: Feb. 16, 2021

(86) PCT No.: PCT/JP2021/005665
§ 371 (c)(1),
(2) Date: Aug. 22, 2022

(87) PCT Pub. No.: WO2021/186988
PCT Pub. Date: Sep. 23, 2021

(65) Prior Publication Data
US 2023/0082432 A1     Mar. 16, 2023

(30) Foreign Application Priority Data
Mar. 16, 2020   (JP) ................................. 2020-045337

(51) Int. Cl.
*G06T 7/00* (2017.01)
*G06F 30/23* (2020.01)

(52) U.S. Cl.
CPC ............ *G06T 7/0008* (2013.01); *G06F 30/23* (2020.01); *G06T 2207/10072* (2013.01)

(58) Field of Classification Search
CPC ......... G06T 7/0008; G06T 2207/10072; G06T 17/00; G06T 19/00; G06T 7/0012;
(Continued)

(56) References Cited

U.S. PATENT DOCUMENTS

2011/0205583 A1* 8/2011 Young ....................... G06F 3/12
                                                                358/1.15
2018/0033193 A1* 2/2018 Goel ....................... G06T 17/00
(Continued)

FOREIGN PATENT DOCUMENTS

CN     108381916 A  *  8/2018  ............. B29C 64/20
JP     H09-180002 A      7/1997
(Continued)

OTHER PUBLICATIONS

International Search Report in corresponding International Application No. PCT/JP2021/005665, dated Apr. 27, 2021 (4 pages).
(Continued)

*Primary Examiner* — Aaron W Carter
(74) *Attorney, Agent, or Firm* — Osha Bergman Watanabe & Burton LLP

(57) ABSTRACT

A computing device includes: a tomographic image acquisition unit that acquires a plurality of tomographic images representing shapes of reinforcing fibers and shapes of resin in a plurality of cross sections obtained when an article containing the reinforcing fibers and the resin is divided in parallel; and a computing unit that calculates a rigidity parameter of each of a plurality of small regions obtained by dividing the article, based on the plurality of acquired tomographic images.

4 Claims, 6 Drawing Sheets

(58) Field of Classification Search
CPC ....... G06F 30/23; G01N 23/04; A61B 5/0095; A61B 3/0025; A61B 3/102
See application file for complete search history.

(56) References Cited

U.S. PATENT DOCUMENTS

| | | | |
|---|---|---|---|
| 2018/0033194 A1* | 2/2018 | Goel | G06T 17/00 |
| 2018/0095450 A1* | 4/2018 | Lappas | G05B 19/4099 |
| 2018/0144219 A1* | 5/2018 | Kalisman | G06K 15/02 |
| 2019/0039316 A1* | 2/2019 | Su | B29C 64/393 |

FOREIGN PATENT DOCUMENTS

| | | | | |
|---|---|---|---|---|
| JP | 4581539 B2 | | 11/2010 | |
| JP | 2011000758 A | * | 1/2011 | ............ G06F 17/50 |
| JP | 2019093716 A | * | 6/2019 | ............ B44F 1/04 |
| WO | WO-2018031594 A1 | * | 2/2018 | ............ G06T 17/20 |
| WO | WO-2018235150 A1 | * | 12/2018 | ............ G06F 30/23 |

OTHER PUBLICATIONS

Written Opinion in corresponding International Application No. PCT/JP2021/005665, dated Apr. 27, 2021 (6 pages).

\* cited by examiner

COMPUTING DEVICE AND COMPUTING METHOD FOR EVALUATING STRENGTH OF ARTICLE FORMED BY 3D PRINTER

TECHNICAL FIELD

The present disclosure relates to a computing device, a computing method, and a storage medium storing a program.

Priority is claimed on Japanese Patent Application No. 2020-045337, filed Mar. 16, 2020, the content of which is incorporated herein by reference.

BACKGROUND ART

As a method for analyzing the strength of a material, a finite element method (FEM) is known.

PTL 1 discloses a technique for dividing a microscopic observation image of a composite material into a plurality of regions, and generating a finite element model of the composite material.

PTL 2 discloses a technique for accurately reproducing the shape and the internal stress of a structure, by acquiring the residual stress of a tire, for an initial analysis model that reproduces the shape of the tire and executing a balancing calculation to create a modified analysis model.

CITATION LIST

Patent Literature

[PTL 1] Japanese Unexamined Patent Application Publication No. 09-180002
[PTL 2] Japanese Patent No. 4581539

SUMMARY OF INVENTION

Technical Problem

Incidentally, fiber reinforced plastics containing reinforcing fibers and resins are known. The strength of fiber reinforced plastic depends on the direction and density of the fibers.

In recent years, 3D printers and the like that form fiber reinforced plastics have been studied, and articles made of fiber reinforced plastics may have a complicated internal structure. In this case, the rigidity inside the article is not uniform. Therefore, in a case of appropriately evaluating the strength by the finite element method, it is necessary to obtain the rigidity parameter for each of a plurality of small regions obtained by dividing the article, based on a complicated internal shape.

An object of the present disclosure is to provide a computing device, a computing method, and a storage medium storing a program for solving the above-described problems.

Solution to Problem

A computing device according to the present disclosure includes: a tomographic image acquisition unit that acquires a plurality of tomographic images representing shapes of reinforcing fibers and shapes of resin in a plurality of sections obtained when an article containing the reinforcing fibers and the resin is divided in parallel; and a computing unit that calculates a rigidity parameter of each of a plurality of small regions obtained by dividing the article, based on the plurality of acquired tomographic images.

A computing method according to the present disclosure includes: a step of acquiring a plurality of tomographic images representing shapes of reinforcing fibers and shapes of resin in a plurality of cross sections obtained when an article containing the reinforcing fibers and the resin is divided in parallel; and a step of calculating a rigidity parameter of each of a plurality of small regions obtained by dividing the article, based on the plurality of acquired tomographic images.

A non-transitory computer-readable storage medium storing a program according to the present disclosure causes a computer to execute: a step of acquiring a plurality of tomographic images representing shapes of reinforcing fibers and shapes of resin in a plurality of cross sections obtained when an article containing the reinforcing fibers and the resin is divided in parallel; and a step of calculating a rigidity parameter of each of a plurality of small regions obtained by dividing the article, based on the plurality of acquired tomographic images.

Advantageous Effects of Invention

According to at least one of the above aspects, it is possible to generate data for strength evaluation by using the rigidity parameter calculated by reflecting the internal structure of an article.

DESCRIPTION OF EMBODIMENTS

First Embodiment (Configuration of Computing System)
Hereinafter, embodiments will be described in detail with reference to the drawings.

Figure 1:
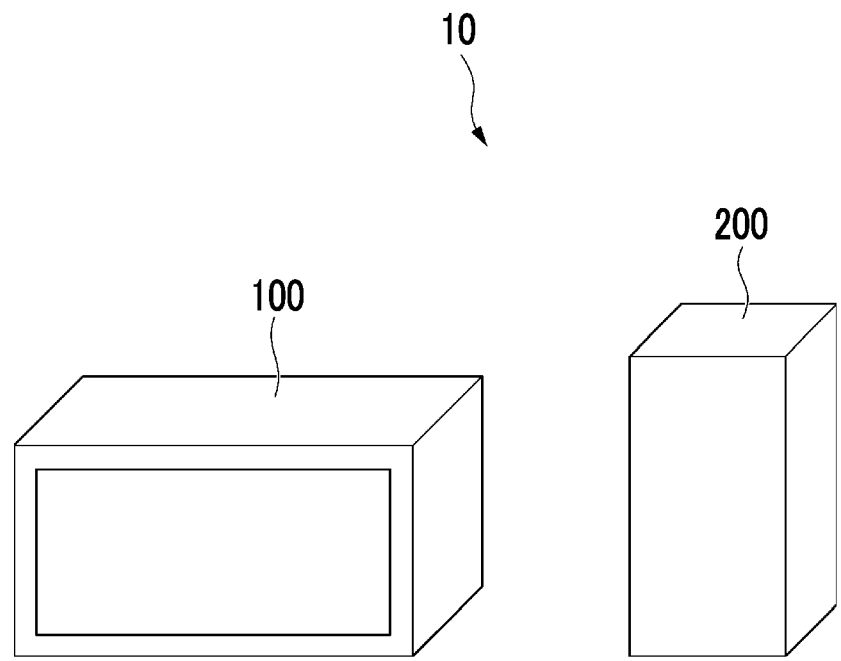
FIG. 1 is a diagram showing a configuration of a computing system according to an embodiment.

FIG. 1 is a diagram showing a computing system 10 according to the first embodiment.

The computing system 10 is a system that evaluates the strength of the article 300 formed by the 3D printer 100. The computing system 10 includes a 3D printer 100 and a computing device 200. The 3D printer 100 is connected to the computing device 200 by wire or wirelessly. The article 300 is made of a fiber reinforced plastic material containing reinforcing fibers and resin.

(Configuration of 3D Printer)

Hereinafter, the configuration of the 3D printer 100 will be described.

The 3D printer 100 receives the input of Computer-Aided Design (CAD) data 310 indicating the three-dimensional shape of the article 300, and forms the article 300, based on the CAD data 310. The 3D printer 100 includes a header that outputs reinforcing fibers, and a header that outputs resin, and forms an article 300 by laminating layers of the reinforcing fibers and the resin output by the headers.

The 3D printer 100 calculates the path of the header for forming each layer forming the article 300, based on the CAD data 310, and drives the header, based on the path. The 3D printer 100 has a function of outputting a plurality of images representing the path of the header in each layer, for reference by the user.

The reinforcing fibers are a material used for producing the article 300 and improving the strength of the article 300. Examples of reinforcing fibers include carbon fibers and glass fibers. The reinforcing fibers in the first embodiment is a carbon fiber. Further, she resin is a material used for producing the article 300 and forming the article 300. Examples of the resin include nylon resin, epoxy resin, urethane resin, polyetheretherketone (PEEK), polyetherketoneketone (PEEK) and the like.

An example of the detailed operation of the 3D printer 100 will be described below.

Figure 2:
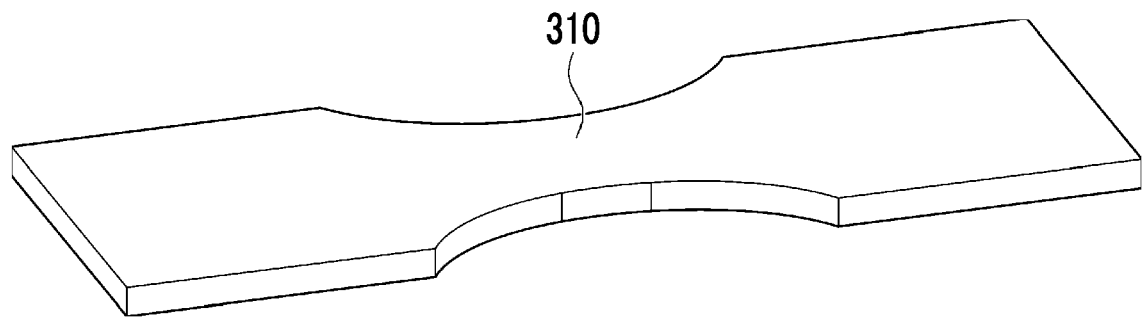
FIG. 2 is a diagram showing an example of CAD data according to the embodiment.

First, the 3D printer 100 receives CAD data 310 showing the article 300. FIG. 2 is a diagram showing an example of the CAD data 310 according to the first embodiment. The CAD data 310 is an image representing the shape of the article 300 in three dimensions.

In a case of receiving the CAD data 310, the 3D printer 100 divides the three-dimensional shape represented by the CAD data 310 according to the stacking thickness of the 3D printer 100 to specify the cross-sectional shape of the article 300. The stacking thickness may be set by the user, or may be preset in the 3D printer 100.

The 3D printer 100 determines the path of the header that outputs the reinforcing fibers in each layer, based on the cross-sectional shape of each layer divided according to the stacking thickness. The path 322 of the header of the reinforcing fibers is determined based on predetermined constraints. Examples of constraints include an allowable bending angle and a density.

Figure 3:
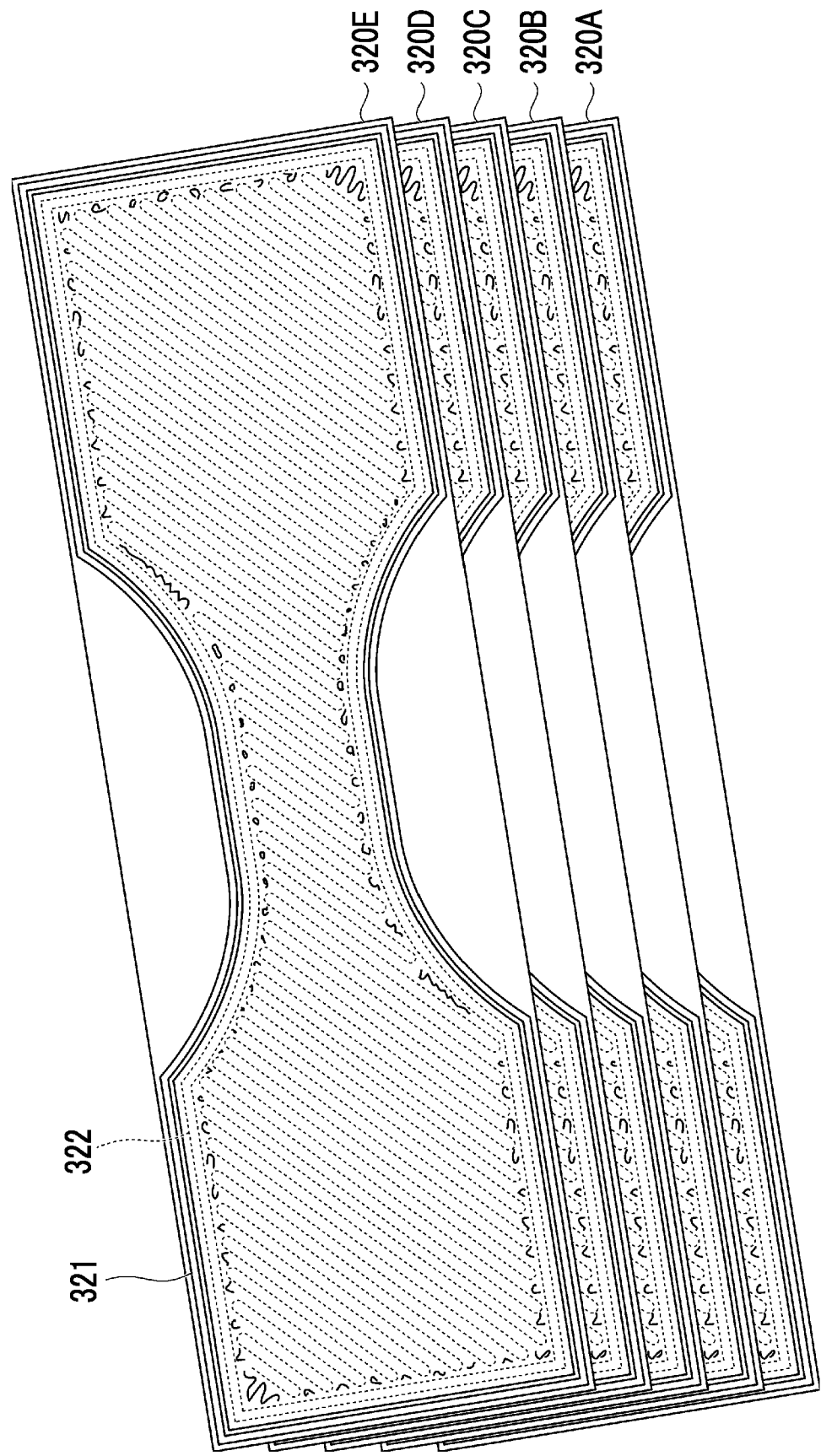
FIG. 3 is a diagram showing an example of a tomographic image according to an embodiment.

Next, the 3D printer 100 determines the path of the header that outputs the resin, based on the cross-sectional shape of each layer and the path 322 of the header of the reinforcing fibers. The path of the header that outputs the resins is determined to fill the part of the cross-sectional shape through which the header of the reinforcing fibers does not pass. The 3D printer 100 generates a plurality of tomographic images 320 showing the path 322 of the header of the reinforcing fibers and the path 321 of the header of the resin in each layer. FIG. 3 is a diagram showing an example of the tomographic image 320 according to the first embodiment. The tomographic image 320 is an image showing the path 322 of the header of the reinforcing fibers and the path 321 of the header of the resin in different colors. That is, the tomographic image 320 is a raster image showing the reinforcing fibers and the resin with pixels having different values. In FIG. 3, the path 322 of the header of the reinforcing fibers is shown by a white dotted line, and the path 321 of tine header of the resin is shown by a solid white line.

In the example shown in FIG. 3, the 3D printer 100 divides the three-dimensional shape represented by the CAD data 310 five pieces at intervals of stacking thickness to generate a tomographic image 320A, a tomographic image 320B, a tomographic image 320C, a tomographic image 320D, and a tomographic image 320E.

(Configuration of Computing Device)

Hereinafter, the configuration of the computing device 200 will be described.

Figure 4:
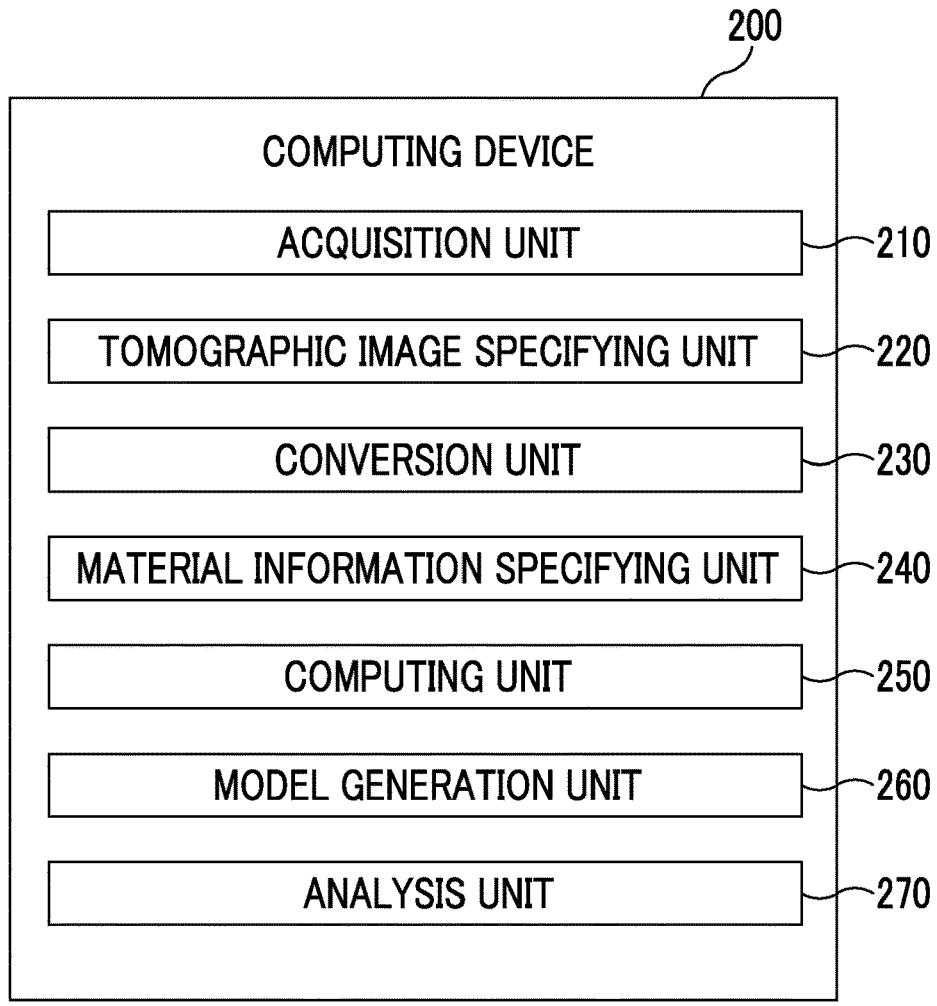
FIG. 4 is a schematic block diagram showing a computing device according to an embodiment.

FIG. 4 is a schematic block diagram showing the configuration of the computing device 200. The computing device 200 analyzes the strength of the article 300, based on the plurality of tomographic images 320 output by the 3D printer 100 and the calculation grid obtained by dividing the three-dimensional shape of the article 300 into a plurality of small regions. The computing device 200 includes an acquisition unit 210, a tomographic image specifying unit 220, a conversion unit 230, a material information specifying unit 240, a computing unit 250, a model generation unit 260, and an analysis unit 270.

The acquisition unit 210 acquires a plurality of tomographic images 320 from the 3D printer 100. The acquisition unit 210 is an example of a tomographic image acquisition unit. For example, the acquisition unit 210 acquires, from the 3D printer 100, the tomographic image 320A, the tomographic image 320B, the tomographic image 3200, the tomographic image 320D, and the tomographic image 320E, as shown in FIG. 3.

Figure 5:
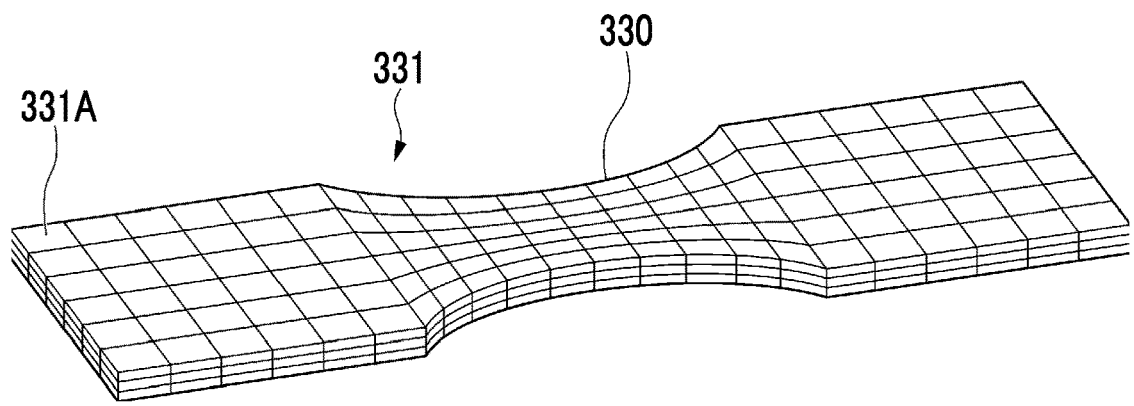
FIG. 5 is a diagram showing an example of calculation grid data according to the embodiment.

Further, the acquisition unit 210 acquires calculation grid data 330 from the user of the computing system 10. The calculation grid data 330 is information indicating a plurality of Solid elements 331 obtained by dividing the article 300. FIG. 5 as a diagram showing an example or the calculation grid data 330. In the calculation grid data 330 shown in FIG. 5, three Solid elements 331 in the height direction x, six Solid elements 331 in the depth direction x, and 22 Solid elements 331 in the width direction are arranged. That is, in the example shown in FIG. 5, the calculation grid is obtained by dividing the three-dimensional shape of the article 300 into a total of 396 Solid elements 331. The Solid element 331 is an example of a small region obtained by dividing the three-dimensional shape of the article 300.

The tomographic image specifying unit 220 aligns the tomographic image 320 acquired by the acquisition unit 210 with the Solid element 331 of the calculation grid data 330 acquired by the acquisition unit 210 to specify a part of the tomographic image 320 corresponding to the Solid element 331. That is, the tomographic image specifying unit 220 converts the coordinate system of the plurality of tomographic images 320 into the coordinate system of the calculation grid data 330. Since the stacking thickness of the 3D printer 100 is known in advance, the tomographic image specifying unit 220 can calculate the three-dimensional shape of the article 300, based on the plurality of tomographic images 320 and the stacking thickness. Therefore, the tomographic image specifying unit 220 can align the tomographic image 320 with the calculation grid data 330, by specifying the posture to minimize the error between the three-dimensional shape generated from the tomographic image 320 and the three-dimensional shape represented by the calculation grid data 330. For example, the tomographic image specifying unit 220 aligns the tomographic image 320 as shown in FIG. 3 with the Solid element 331A of the calculation grid data 330 as shown in FIG. 5, and specifies a part of the tomographic image 320 corresponding to the Solid element 331A. Thus, the tomographic image specifying unit 220 specifies the portion of the tomographic image 320E corresponding to the position of the Solid element 331A in the article 300, and the portion of the tomographic image 320D.

As shown in FIG. 5, the calculation grid data 330 is divided into three pieces in the height direction. On the other hand, as shown in FIG. 3, the tomographic image 320 is divided into five pieces in the height direction. As described above, usually, the number of tomographic images 320 divided in the height direction is larger than the number of divisions in which the calculation grid data 330 divided in the height direction. Therefore, the number of tomographic images 320 corresponding to one Solid element 331A is not one but plural.

The conversion unit 230 generates a vector image representing the reinforcing fibers by a path element, from each tomographic image 320 which is a raster image. For example, the conversion unit 230 may generate a vector image by specifying a figure consisting of pixels showing the reinforcing fibers of the tomographic image 320 and performing a thinning process on the figure.

The material information, specifying unit 240 specifies the area ratio between the reinforcing fibers and the resin in the Solid element 331, based on the partial image of the tomographic image 320 corresponding to each Solid element 331 specified by the tomographic image specifying unit 220. For example, the material information specifying unit 240 calculates the ratio between the number of pixels related to the reinforcing fibers and the number of pixels related to the resin in each partial image. Further, the material information specifying unit 240 specifies the direction of the reinforcing fibers in each small region, based on the vector image converted by the conversion unit 230.

The computing unit 250 calculates a rigidity parameter of the Solid element 331, based on the area ratio between the reinforcing fibers and the resin specified by the material information specifying unit 240 and the direction of the reinforcing fibers. Examples of rigidity parameter include parameters such as longitudinal elastic modulus, shear modulus, and Poisson's ratio in each direction such as the X-axis direction, the Y-axis direction, and the Z-axis direction. The value of the longitudinal elastic modulus differs depending on the direction. The operation of the computing unit 250 to calculate the rigidity parameter will be described below.

The computing unit 250 calculates the rigidity parameter by the following operation.

The computing unit 250 receives the area ratio between the reinforcing fibers and the resin specified by the material information specifying unit 240. After that, the computing unit 250 homogenizes the rigidity of the carbon fiber reinforced plastic (CFRP) and the rigidity of the resin in the above area ratio to calculate the characteristics. Further, the computing unit 250 detects the angle of the reinforcing fibers, and converts the calculated characteristic according to the angle by using the relational expression between the angle and the rigidity. Here, the angle of the fiber indicates an angle from a preset reference angle. In this way, the computing unit 250 can calculate the rigidity parameter.

Further, the computing unit 250 homogenizes the rigidity parameter calculated from all the images contained in one Solid element 331. For example, the computing unit 250 performs a calculation to homogenize the rigidity parameter by using various formulas of the equivalent rigidity matrix.

The model generation unit 260 generates a Solid model used for the finite element method by storing the rigidity parameter calculated by the computing unit 250 in the calculation grid data 330 acquired by the acquisition unit 210.

The analysis unit 270 performs analysis by the finite element method, based on the rigidity parameter of the Solid element 331 calculated by the computing unit 250. That is, the analysis unit 270 evaluates the strength through analysis by the finite element method, based on the Solid model generated by the model generation unit 260.

(Operation of Computing System)

Hereinafter, the operation of the computing system 10 will be described.

Figure 6:
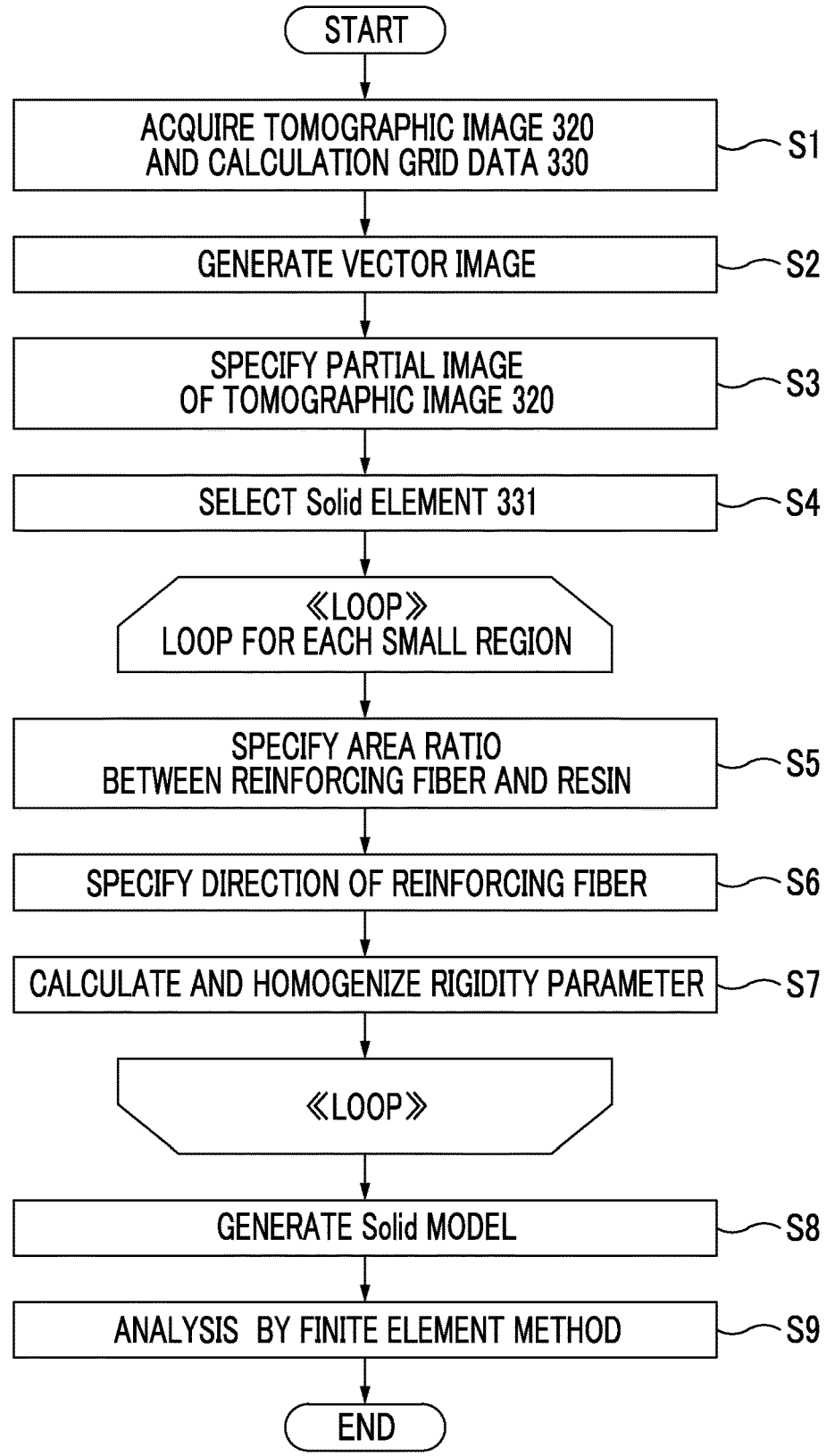
FIG. 6 is a flowchart showing the operation of the computing system according to the embodiment.

FIG. 6 is a flowchart showing the operation of the computing system 10.

The acquisition unit 210 acquires a plurality of tomographic images 320 from the 3D printer 100, and acquires the calculation grid data 330 from the user of the computing system 10 (step S1). The calculation grid data 330 is generated by dividing the three-dimensional shape represented by the CAD data 310 into a mesh in advance by the user.

The conversion unit 230 generates a vector image representing the reinforcing fibers by a path element, from each tomographic image 320 which is a raster image (step S2).

The tomographic image specifying unit 220 aligns the tomographic image 320 acquired in step S2 with the Solid element 331 of the calculation grid data 330, and specifies a partial image of the tomographic image 320 corresponding to each Solid element 331 (step S3).

The computing device 200 selects a plurality of Solid elements 331 included in the calculation grid data 330 one by one, and executes the processes of the following steps S5 to S7 for each small region (step S4).

The material information specifying unit 240 specifies the area ratio between the reinforcing fibers and the resin in the Solid element 331, based on the partial image of the tomographic image 320 corresponding to the Solid element 331 selected in step S4 (step S5).

The material information specifying unit 240 specifies the direction of the reinforcing fibers in the Solid element 331 selected in step S4, based on the part of the vector image generated in step S2 corresponding to the Solid element 331 selected in step S3 (step S6).

The computing unit 250 calculates a rigidity parameter of the Solid element 331 selected in step S4, based on the area ratio between the reinforcing fibers and the resin specified in step S5 and the direction of the reinforcing fibers specified in step S6 (step S7). That is, the computing unit 250 calculates the rigidity parameter, and homogenizes the rigidity parameter, based on various formulas of the equivalent rigidity matrix.

When the rigidity parameter are calculated for all of the plurality of Solid elements 331 included in the calculation grid data 330, the model generation unit 260 generates a Solid model used for the finite element method by storing the rigidity parameter calculated in step S7 in the calculation grid data 330 acquired in step S1 (step S8).

The analysis unit 270 performs analysis by the finite element method, based on the Solid model generated in step S8. That is, the analysis unit 270 evaluates the strength through analysis by the finite element method, based on the rigidity parameter of all the Solid elements 331 of the article 300 (step S9).

By the above operation, the computing system 10 calculates the rigidity parameter by using the tomographic image 320 and the calculation grid data 330, and evaluates the strength of the article 300 by the finite element method. The user of the computing system 10 can perform strength evaluation by the finite element method reflecting the internal structure of the article 300.

(Action, Effect)

A computing device 200 according to the present disclosure includes: a tomographic image acquisition unit that acquires a plurality of tomographic images 320 representing shapes of reinforcing fibers and shapes of resin in a plurality of cross sections obtained when an article 300 containing the reinforcing fibers and the resin is divided in parallel; and a computing unit 250 that calculates a rigidity parameter of each of a plurality of small regions obtained by dividing the article 300, based on the plurality of acquired tomographic images 320.

The computing device 200 calculates the rigidity parameter by using the tomographic image 320 and the calculation grid data 330. This enables the user of the computing device 200 to evaluate the strength by using the rigidity parameter calculated by reflecting the internal structure of the article 300.

Further, the computing device 200 includes a material information specifying unit 240 that specifies the area ratio between the reinforcing fibers and the resin in each small region and the direction of the reinforcing fibers, based on the acquired plurality of tomographic images 320, and the computing unit 250 calculates the rigidity parameter of each of the plurality of small regions, based on the specified area ratio and direction.

The computing device 200 specifies the area ratio between the reinforcing fibers and the resin and the direction of the reinforcing fibers, and calculates a rigidity parameter. This enables the user of the computing device 200 to perform strength evaluation reflecting the internal structure of the article 300.

Further, the plurality of tomographic images 320 are represented by raster images in which the reinforcing fibers and the resin are represented by pixels having different values, the computing device 200 includes a conversion unit 230 that generates a vector image having a path representing the shapes of the reinforcing fibers, from each of the plurality of tomographic images 320, and the material information specifying unit 240 specifies the direction of the reinforcing fibers, based on the vector image.

The computing device 200 specifies the direction of the reinforcing fibers based on the vector image and calculates the rigidity parameter. This enables the user of the computing device 200 to perform strength evaluation reflecting the internal structure of the article 300.

Further, the plurality of tomographic images 320 of the computing device 200 represent the path of the header when the 3D printer 100 capable of outputting the reinforcing fibers and the resin forms the article 300.

The computing device 200 calculates the rigidity parameter by using the tomographic images 320 generated by the 3D printer 100. This enables the user of the computing device 200 to perform strength evaluation reflecting the internal structure of the article 300.

Further, the computing device 200 includes an analysis unit 270 that analyzes the strength of the article 300, based on the calculated rigidity parameter.

The user of the computing device 200 can evaluate the strength based on the rigidity parameter calculated by reflecting the internal structure of the article 300.

Second Embodiment

Hereinafter, a computing system 10 according to a second embodiment will be described.

Figure 7:
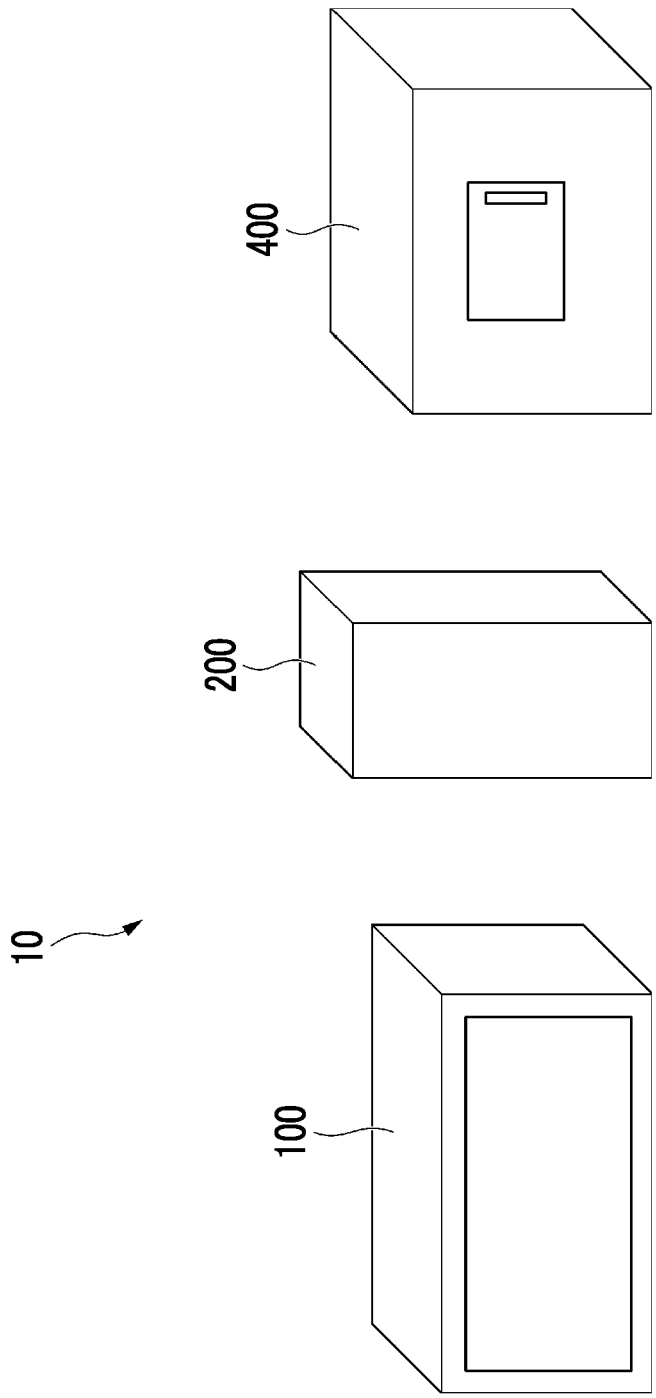
FIG. 7 is a diagram showing a configuration of a computing system according to an embodiment.

The computing system 10 according to the second embodiment includes an X-ray CT device 400 in addition to a 3D printer 100 and a computing device 200. The X-ray CT device 400 is connected to the computing device 200 by wire or wirelessly. FIG. 7 is a diagram showing a configuration of the computing system 10 according to the second embodiment.

The X-ray CT device 400 irradiates the article 300 with X-rays to generate an X-ray Computed Tomography (CT) image represented by voxel data. That is, the user inputs the article 300 formed by the 3D printer 100 into the X-ray CT device 400, and causes the X-ray CT device 400 to generate an X-ray CT image. After the X-ray CT process by the X-ray CT device 400 is completed, the user inputs the tomographic image 320 generated by the 3D printer 100 and the X-ray CT image generated by the X-ray CT device 400 into the computing device 200.

Figure 8:
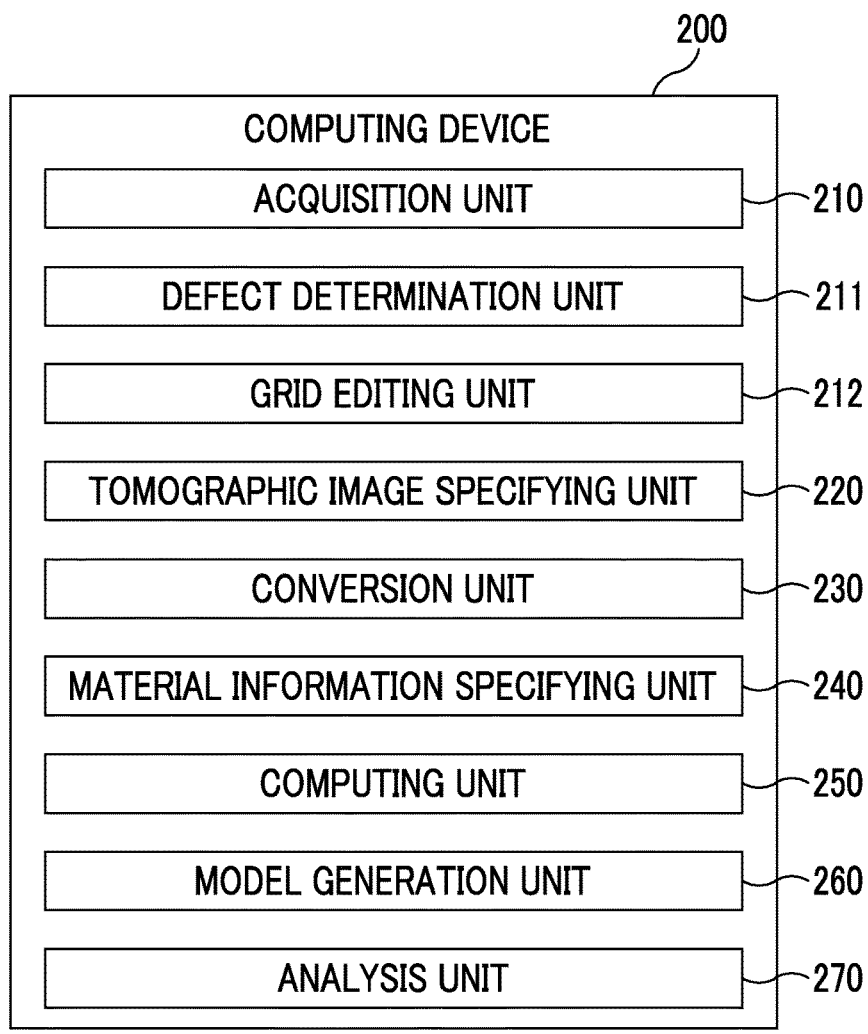
FIG. 8 is a schematic block diagram showing the configuration of the computing device according to the embodiment.

FIG. 8 is a schematic block diagram showing the configuration of the computing device 200 according to the second embodiment. The computing device 200 according to the second embodiment includes a defect determination unit 211 and a grid editing unit 212 in addition to the configuration of the computing device 200 according to the first embodiment.

The acquisition unit 210 according to the second embodiment is an example of a tomographic image acquisition unit and a defect data acquisition unit. The acquisition unit 210 acquires tomographic images 320 from the 3D printer 100, and acquires the calculation grid data 330 from the user of the computing system 10. Further, the acquisition unit 210 acquires an X-ray CT image of the article 300 generated by the X-ray CT device 400, from the X-ray CT device 400. The X-ray CT image acquired by the acquisition unit 210 is an example of defect data indicating a defect location of the article 300.

The defect determination unit 211 determines whether or not each Solid element 331 of the calculation grid data 330 corresponds to a defect location. The detailed operation of the defect determination unit 211 will be described below.

The defect determination unit 211 aligns the X-ray CT image acquired by the acquisition unit 210 with the Solid element 331 of the calculation grid data 330 acquired by the acquisition unit 210, and specifies a part of the X-ray CT image corresponding to the Solid element 331. That is, the defect determination unit 211 converts the coordinate system of the X-ray CT image into the coordinate system of the calculation grid data 330. After that, the defect determination unit 211 can align the X-ray CT image with the calculation grid data 330, by specifying the posture to minimize the error between the three-dimensional shape generated from the X-ray CT image and the three dimensional shape represented by the calculation grid data 330.

After specifying the part of the X-ray CT image corresponding to the Solid element 331, the defect determination unit 211 compares the voxel data included in the X-ray CT image corresponding to each Solid element 331 with the preset threshold information, and determines whether or not each Solid element 331 corresponds to the defect location. Examples of defects include voids, weak bonds, cracks and the like. After that, defect determination unit 211 generates defect data which is information in which each Solid element 331 is associated with whether or not the Solid element 331 corresponds to the defect location.

The grid editing unit 212 deletes the Solid elements 331 corresponding to the defect locations among the Solid elements 331 of the calculation grid data 330 acquired by the acquisition unit 210, based on the defect data generated by the defect determination unit 211.

The computing system 10 deletes the Solid elements 331 corresponding to the defect locations of the article 300, and generates a rigidity parameter to evaluate the strength. Therefore, the user of the computing system 10 can calculate the rigidity parameter reflecting the internal structure including the defect information of the article 300, and evaluate the strength.

Instead of deleting the Solid elements 331 corresponding to the defect locations, the computing system 10 may perform strength evaluation reflecting the defect location, by editing a rigidity parameter of the Solid element 331.

(Action, Effect)

The computing device 200 according to the present disclosure includes a defect acquisition unit that acquires defect data indicating a defect location of the article 300, and the computing unit 250 calculates the rigidity parameter of each of a plurality of small regions, based on the plurality of tomographic images 320 and the defect data.

The computing device 200 generates a rigidity parameter based on the defect data of the article 300 and evaluates the strength. Therefore, the user of the computing system 10 can calculate the rigidity parameter reflecting the internal structure including the defect data of the article 300 and evaluate the strength.

Other Embodiments

Although one embodiment has been described in detail with reference to the drawings, the specific configuration is not limited to the above-described configuration, and various design changes and the like can be made.

The calculation grid data 330 in the above embodiment is composed of the Solid element 331, but may be composed of Shell elements instead.

Figure 9:
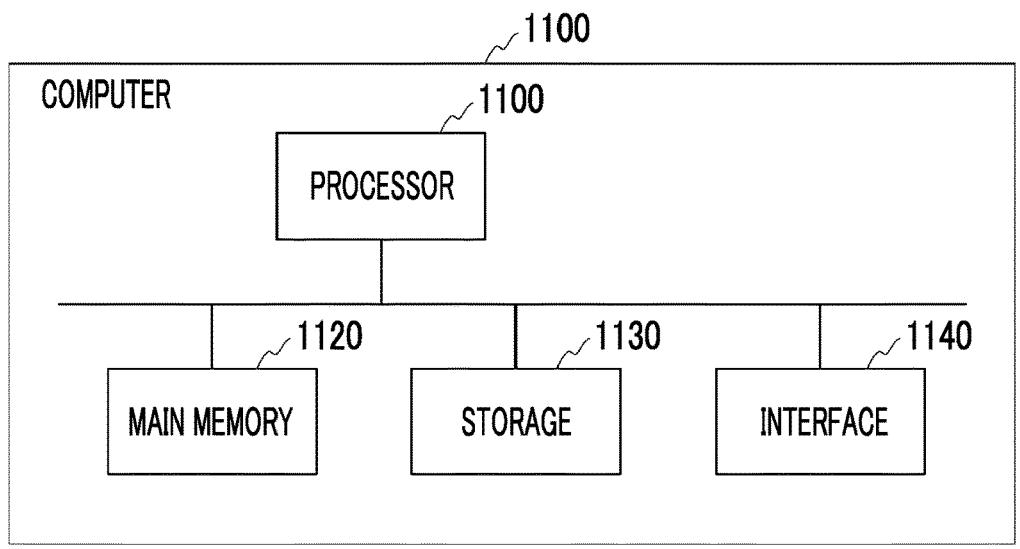
FIG. 9 is a schematic block diagram illustrating a configuration of a computer according to at least one embodiment.

FIG. 9 is a schematic block diagram illustrating a configuration of a computer 1100 according to at least one embodiment.

A computer 1100 includes a processor 1110, a main memory 1120, a storage 1130, and an interface 1140.

The computing device 200 described above is mounted on the computer 1100. The operation of each processing unit described above is stored in the storage 1130 in the form of a program. The processor 1110 reads a program from the storage 1130, expands the read program into the main memory 1120, and executes the above process according to the program. Further, the processor 1110 secures a storage area corresponding to each of the above-described storage units in the main memory 1120, according to the program.

The program may be for achieving some of the functions performed by the computer 1100. For example, the program may perform its function in combination with another program already stored in the storage 1130 or in combination with another program mounted on another device. In another embodiment, the computer 1100 may include a custom Large Scale Integrated Circuit (LSI) such as a Programmable Logic Device (PLD) in addition to or in place of the above configuration. Examples of PLDs include Programmable Array Logic (PAL), Generic Array Logic (GAL), Complex Programmable Logic Device (CPLD), and Field Programmable Gate Array (FPGA). In this case, some or all of the functions achieved by the processor 1110 may be achieved by the integrated circuit.

Examples of the storage 1130 include a magnetic disk, a magneto-optical disk, and a semiconductor memory. The storage 1130 may be an internal medium directly connected to the bus of the computer 1100, or may be an external medium connected to the computer 1100 through the interface 1140 or a communication line. Further, when this program is delivered to the computer 1100 through a communication line, the computer 1100 receiving the delivered program may develop the program in the main memory 1120 and execute the above process. In at least one embodiment, the storage 1130 is a non-transitory tangible storage medium or a non-transitory computer-readable storage medium.

Further, the program may be for implementing a part of the above-described functions. Further, the program may be a so-called differential file (differential program) which realizes the above-described function in combination with other programs already stored in the storage 1130.

[Additional Notes]

The computing device 200 described in each embodiment is understood as follows, for example.

(1) A computing device 200 according to the present disclosure includes: a tomographic image acquisition unit that acquires a plurality of tomographic images 320 representing shapes of reinforcing fibers and shapes of resin in a plurality of cross sections obtained when an article 300 containing the reinforcing fibers and the resin is divided in parallel; and a computing unit 250 that calculates a rigidity parameter of each of a plurality of small regions obtained by dividing the article 300, based on the plurality of acquired tomographic images 320.

The computing device 200 calculates the rigidity parameter by using the tomographic image 320 and the calculation grid data 330. This enables the user of the computing device 200 to evaluate the strength by using the rigidity parameter calculated by reflecting the internal structure of the article 300.

(2) Further, the computing device 200 may include a material information specifying unit 240 that specifies the area ratio between the reinforcing fibers and the resin in each small region and the direction of the reinforcing fibers, based on the acquired plurality of tomographic images 320, and the computing unit 250 may calculate a rigidity parameter of each of the plurality of small regions, based on the specified area ratio and direction.

The computing device 200 specifies the area ratio between the reinforcing fibers and the resin and the direction of the reinforcing fibers, and calculates a rigidity parameter. This enables the user of the computing device 200 to perform strength evaluation reflecting the internal structure of the article 300.

(3) Further, the plurality of tomographic images 320 are represented by raster images in which the reinforcing fibers and the resin are represented by pixels having different values, the computing device 200 may include a conversion unit 230 that generates a vector image having a path representing the shapes of the reinforcing fibers, from each of the plurality of tomographic images 320, and the material information specifying unit 240 may specify the direction of the reinforcing fibers, based on the vector image.

The computing device 200 specifies the direction of the reinforcing fibers based on the vector image and calculates the rigidity parameter. This enables the user of the computing device 200 to perform strength evaluation reflecting the internal structure of the article 300.

(4) Further, the plurality of tomographic images 320 of the computing device 200 may represent the path of the header when the 3D printer 100 capable of outputting the reinforcing fibers and the resin forms the article 300.

The computing device 200 calculates the rigidity parameter by using the tomographic images 320 generated by the 3D printer 100. This enables the user of the computing device 200 to perform strength evaluation reflecting the internal structure of the article 300.

(5) Further, the computing device 200 may include an analysis unit 270 that analyzes a strength of the article 300, based on one calculated rigidity parameter.

The user of the computing device 200 can evaluate the strength based on the rigidity parameter calculated by reflecting the internal structure of the article 300.

(6) The computing device 200 according to the present disclosure may include a defect acquisition unit that acquires defect data indicating a defect location of the article 300, and the computing unit 250 may calculate the rigidity parameter of each of a plurality of small regions, based on the plurality of tomographic images 320 and the defect data.

The computing device 200 generates a rigidity parameter based on the defect data of the article 300 and evaluates the strength. Therefore, the user of the computing system 10 can calculate the rigidity parameter reflecting the internal structure including the defect data of the article 300 and evaluate the strength.

(7) A computing method according to the present disclosure includes: a step of acquiring a plurality of tomographic images 320 representing shapes of reinforcing fibers and shapes of resin in a plurality of cross sections obtained when an article 300 containing the reinforcing fibers and the resin is divided in parallel; and a step of calculating a rigidity parameter of each of a plurality of small regions obtained by dividing the article 300, based on the plurality of acquired tomographic images 320.

The user who uses the computing method can calculate the rigidity parameter by using the tomographic image 320 and the calculation grid data 330. This enables the user of the computing method to evaluate the strength by using the rigidity parameter calculated by reflecting the internal structure of the article 300.

(8) A program according to the present disclosure causes a computer 1100 to execute: a step of acquiring a plurality of tomographic images 320 representing shapes of reinforcing fibers and shapes of resin in a plurality of cross sections obtained when an article 300 containing the reinforcing fibers and the resin is divided in parallel; and a step of calculating a rigidity parameter of each of a plurality of small regions obtained by dividing the article 300, based on the plurality of acquired tomographic images 320.

The user of the program can calculate the rigidity parameter by using the tomographic image 320 and the calculation grid data 330. This enables the user of the program to evaluate the strength by using the rigidity parameter calculated by reflecting the internal structure of the article 300.

The reinforcing fibers are a material used for producing the article 300 and improving the strength of the article 300. Examples of reinforcing fibers include carbon fibers and glass fibers. The reinforcing fibers in the first embodiment is a carbon fiber. Further, the resin is a material used for producing the article 300 and forming the article 300. Examples of the resin include nylon resin, epoxy resin, urethane resin, polyetheretherketone, polyetherketoneketone, and the like.

The calculation grid data 330 is information indicating a plurality of Solid elements 331 obtained by dividing the article 300, or information indicating a plurality of Shell elements obtained by dividing the article 300.

INDUSTRIAL APPLICABILITY

According to the computing device, computing method and program of the present disclosure, it is possible to generate data for strength evaluation by using the rigidity parameters calculated by reflecting the internal structure of an article.

REFERENCE SIGNS LIST

100 3D printer
200 Computing device
210 Acquisition unit
211 Defect determination unit
212 Grid editing unit
220 Tomographic image specifying unit
230 Conversion unit
240 Material information specifying unit
250 Computing unit
260 Model generation unit
270 Analysis unit
300 Article
310 CAD data
320 Tomographic image
321 Path of header of resin
322 Path of header of reinforcing fiber
330 Calculation grid data
331 Solid element
400 X-ray CT device
1100 Computer
1110 Processor
1120 Main memory
1130 Storage
1140 Interface

The invention claimed is:
1. A computing device for evaluating a strength of an article formed by a 3D printer, the device comprising:
a tomographic image acquisition unit that acquires a plurality of tomographic images representing shapes of reinforcing fibers and shapes of resin in a plurality of cross sections obtained when the article containing the reinforcing fibers and the resin is divided in parallel;
a computing unit that calculates a rigidity parameter of each of a plurality of small regions obtained by dividing the article, based on the plurality of acquired tomographic images;
a material information specifying unit that specifies an area ratio between the reinforcing fibers and the resin in each small region and a direction of the reinforcing fibers, based on the plurality of acquired tomographic images; and
a conversion unit that generates a vector image having a path representing the shapes of the reinforcing fibers, from each of the plurality of tomographic images, wherein
the computing unit calculates the rigidity parameter of each of the plurality of small regions, based on the specified area ratio and direction,
the plurality of tomographic images are represented by raster images in which the reinforcing fibers and the resin are represented by pixels having different values, and
the material information specifying unit specifies the direction of the reinforcing fibers, based on the vector image.

2. The computing device according to claim 1, wherein the plurality of tomographic images represent a path of a header when the 3D printer capable of outputting the reinforcing fibers and the resin forms the article.

3. The computing device according to claim 1, further comprising:
a defect acquisition unit that acquires defect data indicating a defect location of the article, wherein
the computing unit calculates the rigidity parameter of each of the plurality of small regions, based on the plurality of tomographic images and the defect data.

4. The computing device according to claim 1, further comprising:
an analysis unit that analyzes a strength of the article, based on the calculated rigidity parameter.

* * * * *